United States Patent [19]

Hallburg

[11] 4,420,181
[45] Dec. 13, 1983

[54] BOAT-CANOPY FOR TRUCK BEDS

[76] Inventor: Wayne A. Hallburg, 1412 Sandhagen, Port Angeles, Wash. 98362

[21] Appl. No.: 270,645

[22] Filed: Jun. 4, 1981

[51] Int. Cl.³ .............................. B60P 7/02; B60P 3/10; B63B 7/02
[52] U.S. Cl. ...................................... 296/157; 114/56; 296/100
[58] Field of Search .................... 296/100, 157; 114/56

[56] References Cited

U.S. PATENT DOCUMENTS

| 3,508,787 | 4/1970 | Strong et al. | 296/157 |
|---|---|---|---|
| 3,704,039 | 11/1972 | Dean | 296/100 |
| 3,870,005 | 3/1975 | Klingler | 114/56 |
| 3,995,890 | 12/1976 | Fletcher | 296/100 |
| 4,036,520 | 7/1977 | Zuidema | 296/157 |
| 4,333,191 | 6/1982 | Long | 114/56 |

Primary Examiner—Richard A. Bertsch
Attorney, Agent, or Firm—William I. Beach

[57] ABSTRACT

A boat structure has a rectangular shape including a twin hull bottom portion and an upper portion adapted to mount on and enclose a truck bed. A horizontally disposed deck strip surrounds and is connected to the upper sides and bow which is adequate to rest securely on the top rail of a truck bed. There are means provided to facilitate a simple procedure of mounting and dismounting the structure on and off of the truck bed.

7 Claims, 10 Drawing Figures

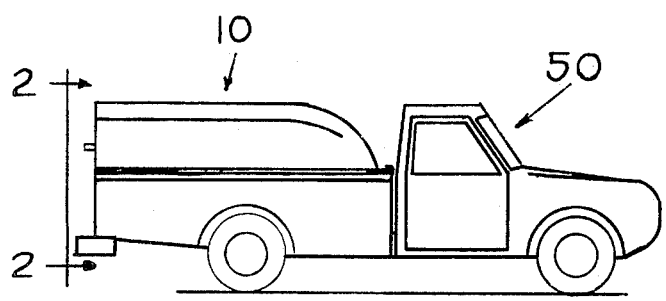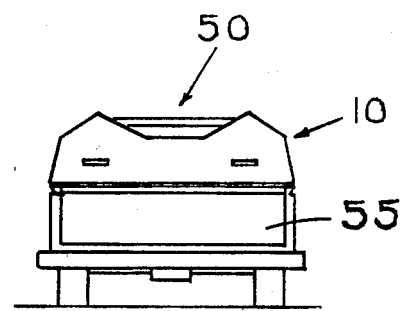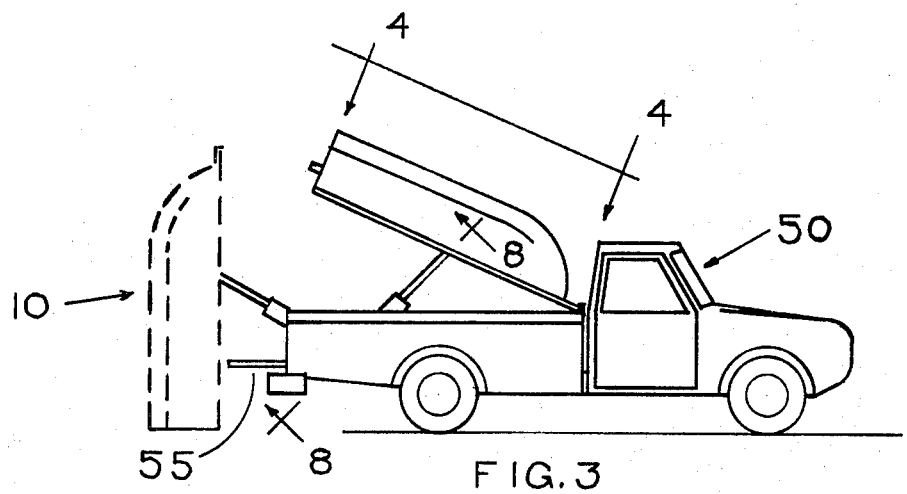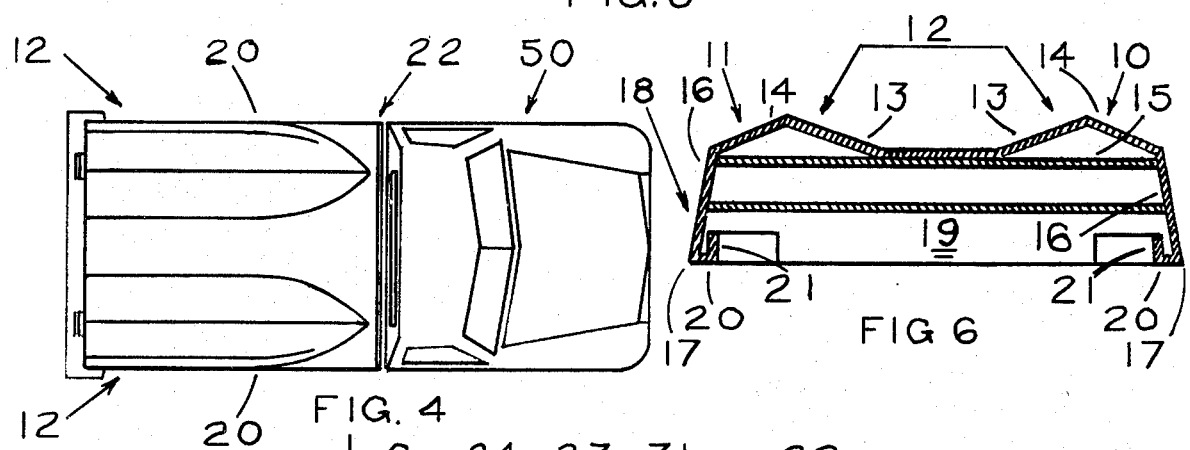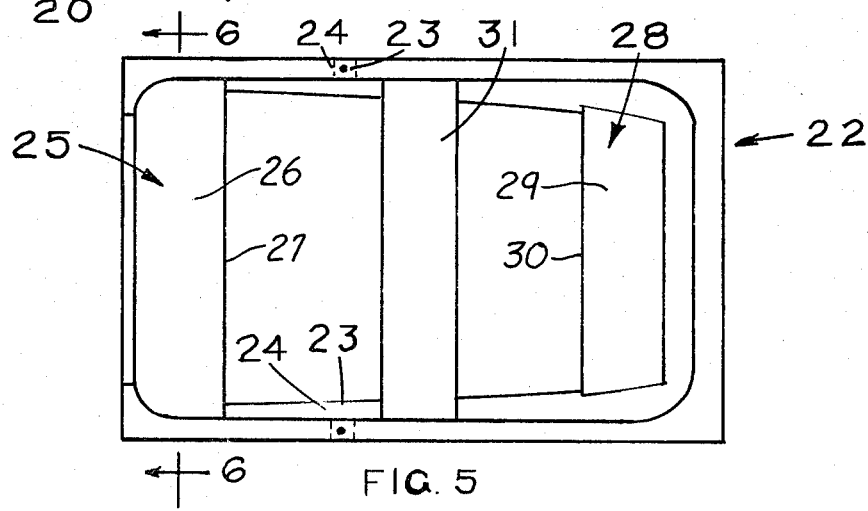

BOAT-CANOPY FOR TRUCK BEDS

BACKGROUND OF THE INVENTION

1. Field of the Invention

The present invention relates to boat type enclosures for truck beds and more particularly a structure that is constructed and equipped to effectively cover a truck bed.

2. Description of the Prior Art

A novelty search of vehicle enclosures relating to boat structures appears to exhibit inadequately conceived devices that provide too many problems. Some are too complicated and expensive to be used for an enclosure. Others, by viture of design and construction require an inordinate amount of time consuming and laborious effort to assemble and mount on a truck bed.

For example, a convertible enclosure is disclosed in U.S. Pat. No. 3,508,787 issued to Rick Strong, et al. This enclosure is a relatively flat bottom rectangular boat comprising a separate shell and bow portion. The shell portion is essentially rectangular in plan view and has a flange type gunwale which overhangs the side walls of the truck bed. The flange is positioned perpendicular to the sides of the bed and provided with several slots so as to engage flexible clip elements fastened in the stake wells located in the top rail of one of the bed side walls. The clip elements together with a hasp type fastener secure the shell on the bed.

To mount the shell, the bow portion is somehow fastened inside and the shell placed inverted with the slotted flange over the clip elements disposed in one or more stake wells on one side of the bed. With one side of the shell and side wall clipped together the other side of the shell is then secured with a hasp fastener. When removed from the bed the bow is taken out and assembled to one end of the shell to complete the boat structure. From the foregoing it is clearly seen that the Strong, et al, enclosure is complicated and expensive for either boat or enclosure.

Another similar enclosure is disclosed in U.S. Pat. No. 4,236,474, issued to David P. Buirski, et al. This enclosure, like the Strong, et al, two part boat structure, provides a main rectangular hull section separated from a pair of short hull segments which are adapted to be connected to one end of the main hull. In addition, several so-called spacer panels are included that apparently may be mounted on the side walls of the truck bed for more livable space. Then the main hull section is fitted on top of the walls to enclose the truck bed. When used solely for a boat, the hull segments are connected to the main hull and then equipped for a motor or sail boat. Obviously, this enclosure including accessories is very complicated and expensive.

There are other types of boat-canopy devices primarily designed for vehicles such as vans and the like. One disclosed in U.S. Pat. No. 3,324,487 issued to K. B. Hiett shows a typical pointed bow boat adapted to be transported on top of a van. The boat gunwale is shaped to fit in and be secured to the drip rail channel on the roof of the van.

Another as disclosed in U.S. Pat. No. 4,036,520 issued to Samuel J. Zuidema, proposes to use a boat for an enclosure for a van having the roof removed. The Zuidema enclosure as well as Hiett's require an excessive amount of preparation and time consuming effort to provide a simple and manageable enclosure. The above cited disclosures do not lend themselves to an efficient designed boat enclosure which provides expedient means for enclosing, mounting and dismounting the structure.

In light of the above referenced prior art it is the object of the present invention to provide a boat-canopy enclosure for open bed trucks that will solve the aforementioned problems. The present invention is a unitary constructed boat which has a peripheral gunwale and deck strip of shape and size to effectively enclose truck beds of several different dimensions. It can be manufactured inexpensively and provides simple means for mounting and dismounting the boat structure on and off of a truck bed.

SUMMARY OF THE INVENTION

In carrying out the principles of the present invention in accordance with a preferred embodiment thereof a boat-canopy enclosure is adapted to enclose an open bed of a truck. The enclosure is essentially a rectangular shaped boat structure that has a bottom portion comprising twin hulls spaced apart and a floor secured to the top of the hulls. The top portion of the structure includes opposed sides extending upwardly from a lower longitudinal connection with the bottom portion along the floor boundary. The top sides and floor extends forwardly to merge together into a square end bow. A rear panel or transom encloses the bottom and top portions of the structure. A deck strip is connected to the upper edge of the sides and bow and adapted to rest on and be secured to the top rail of a truck bed. Provided with the structure are supplemental means connected to both structure and truck bed for detachable mounting the same on the bed. Other means working cooperatively with the detachable mounting means are means for raising the structure to a hatchback position and means for dismounting the structure from a truck bed.

BRIEF DESCRIPTION OF THE DRAWING

FIG. 1 is a side elevational view of the boat-canopy structure of the present invention enclosing the bed of a truck, FIG. 2 is an elevational end view of FIG. 1 taken along line 2—2, FIG. 3 is an elevational side view of the structure raised to hatch-back position and in a dismounted position when removed from the truck bed, FIG. 4 is a bottom plan view taken along line 4—4 of FIG. 3, FIG. 5 is a top plan view of the structure showing the arrangement of deck strip, seats and oarlocks, FIG. 6 is a sectional view of the structure taken along line 6—6 of FIG. 5.

DETAILED DESCRIPTION OF THE PRESENT INVENTION

Figure 7:
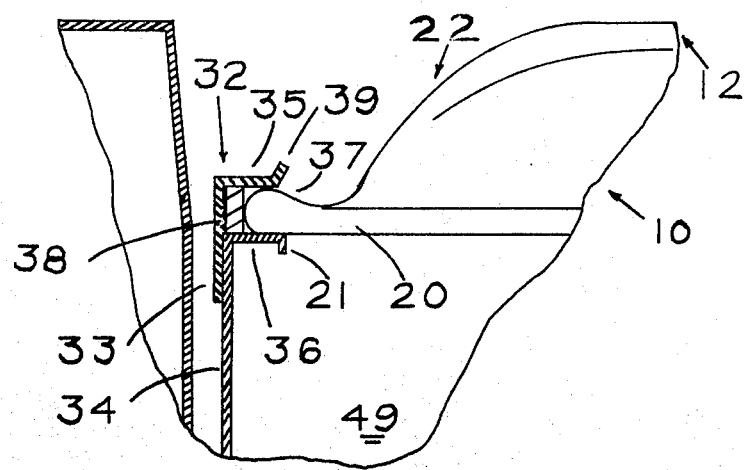
FIG. 7 shows a sectional view of the enclosure of a portion of the bow strip in the space between the L-shaped member and its connection to the truck bed.

Referring to FIGS. 1–9, it can be seen that a boat-canopy structure 10 includes a bottom portion 11 consisting of a pair of spaced twin hulls 12 having inner diverging walls 13 connected at the keel line to outer diverging walls 14. A floor 15 stretches across and is securely connected to walls 13 and 14 to form the bottom portion 11. Integrally connected to the bottom portion 11 at the juncture of floor 15 with outer walls 14 are spaced side walls 16 extending upwardly and outwardly to a gunwale edge 17 to form a top portion 18 of structure 10. A rear panel or transom 19 is disposed in the stern section to enclose the rear ends of the bottom and top portions 11 and 18, respectively. An inwardly extending deck strip 20 disposed horizontally along the gunwale and transversely at the bow has an inwardly turned down lip 21. Lip 21 spaced from the sides 16 merges into and becomes contiguous with the sides and bow 22 near the front section of structure 10. Inserted in the deck strip are openings 23 in opposite sides 16, intermediate to the stern and bow, for containing a pair of oarlocks 24. In the rear of structure 10 is a stern seat 25 having a horizontal wall 26 and a vertical wall 27. The horizontal and vertical walls have outer edges connected and contigious with the interior shape of structure 10. A bow seat 28 similarly connected interiorly has a horizontal wall 29 and vertical wall 30 (not shown). A thwart seat 31 is disposed adjacent to the oarlocks 24 and may be removed when structure 10 is mounted on a truck bed as an enclosure.

To facilitate the mounting and dismounting of the structure on and off of a truck bed supplemental hardware attachments are detachably secured to the structure and bed. These include an elongated L-shaped member 32 reference FIG. 7, that has a vertical leg 33 connected to the transverse wall 34 adjacent to the truck cab such that the truck bed horizontal leg 35 extends over top rail 36 of wall 34 so as to provide space 37 therebetween. A spacer block 38 may be inserted in space 37 between leg 35 and wall 34 for reasons to be explained later. The outer transverse end of horizontal leg 35 is turned upwardly in an arcuate lip 39.

Figure 8:
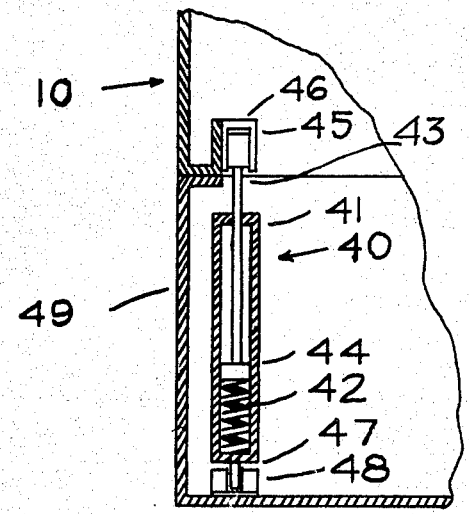
FIG. 8 shows a sectional view of the extensible cylinder connection to structure and truck bed.
Figure 10:
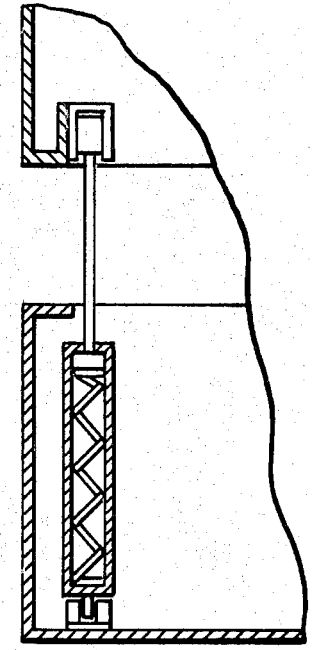
FIG. 10 shows a sectional view of the extensible cylinder in extended position taken along line 8—8 of FIG. 3.

Another attachment is shown in FIG. 8, which comprises an extensible cylinder 40 adapted to be connected to the opposite sides of structure 10 and the floor of the truck bed. Referring again to FIG. 8 it is seen that cylinder 40 has a casing 41 inside of which is a compression spring 42. A reciprocating shaft 43 having a lower T-shaped end 44 rests on top of spring 42 and extends upwardly through the top of the casing to terminate at the upper end 45 pivotally connected to bracket 46. Bracket 46 is in turn secured to the downwardly extending lip 21 of deck strip 20. The bottom of casing 41 extends into lug 47 also pivotally connected to bracket 48 fastened to the floor of the truck bed 49 of truck 50.

Figure 9:
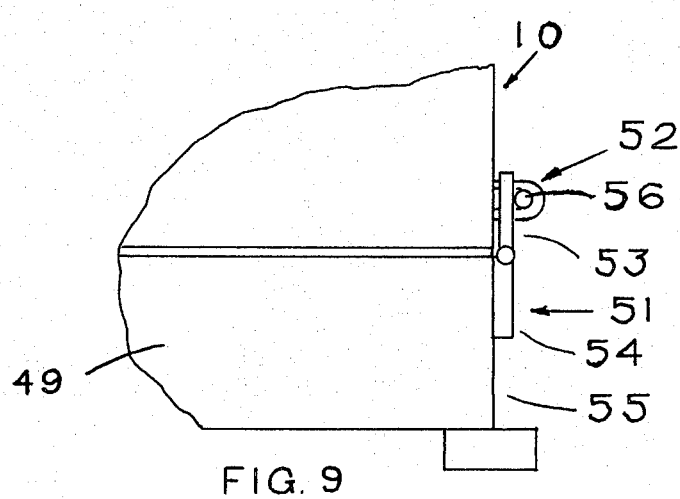
FIG. 9 shows a sectional view of the latch device connection to structure and tailgate of the truck bed.

Yet another attachment is shown in FIG. 9 which consists of a hinged hasp 51 and eye bolt 52. The hasp 51 includes a pivotal arm 53 with an outer end slotted to fit and enclose eye bolt 52 and the other end rotatably connected to arm 54 secured to the tail gate 55 of truck 50. The eye bolt 52 is adapted to be connected to the transom 19 of structure 10 and when engaged with the slotted end of arm 53 of hasp 51 and locked together with pin 56 will secure structure 10 on top of the truck bed.

The boat-canopy enclosure or structure 10 of applicant's invention may be constructed of plywood, metal and other materials selected for boat construction. However, it is preferable that structure 10 be molded and formed in reinforced plastics. A unitary, smooth hull and integrally connected seats, gunwale and, in the present case, a deck strip are obtained advantages. For example, applicant's prototype boat-canopy enclosure by virtue of molding technique provided interior water-tight bouyancy.

A unique feature of the present invention is that, aside from excellent boat lines and water stability meeting U.S. Coast Guard regulations, it provides an overall deck strip 20 that will cover and enclose variable size truck beds. The width of deck strip along the gunwale and across the bow is dimensioned so as to enclose the bed width of several style truck beds. Twin hulls allow rear quarter vision from the cab while backing up when the structure is mounted in canopy position. Prior art has box-shaped forward ends that obstruct rear view in typical blind spot positions. As for variable lengths of the bed, a spacer block 38 shown in FIG. 7 provided in appropriate thickness can be included with the L-shaped member against which the bow edge of deck strip 20 is engaged to move structure 10 back sufficiently to cover variable size truck beds.

Another unique feature associated with the present invention is that it includes supplementary equipment that provides hatch-back usage as well as a boat-canopy enclosure to be mounted and dismounted on and off of a truck bed easily and with minimum amount of effort. FIG. 3 depicts the structure 10 in an open hatch-back position on a truck bed and a phantom view of it dismounted from the truck. This is accomplished first in a mounting procedure by setting the transom 19 of the structure on the ground as shown adjacent to the open tail gate of the truck. In this position, the two cylinders 40 are connected to bracket 46 secured to lip 21 of deck strip 20 and to bracket 48 fastened to the floor of the truck bed. Then the rear end of the structure is lifted upwardly and forwardly allowing it to rotate easily on cylinders 40 pushing the bow downwardly until the deck strip 20 enters the space 37 beneath the horizontal leg 34 of L-shaped member. When the deck strip is enclosed within space 37 the rear end of the inverted boat structure is pulled downwardly while compressing cylinders 40 until deck strip 20 rests on top rail 36 of the truck bed. Thus with the bed enclosed the hasp arm 53 is engaged with eye bolt 52 and inserted with pin 56 to lock the boat structure on the truck bed.

When dismounting the boat structure, the mounting procedure described above is reversed whereupon the cylinders and hasp are released and the boat is available for water sport.

From the description and illustration of the present invention, it is obvious that it provides many important advantages which can be used effectively and efficiently to enclose the bed of a truck.

The foregoing description is to be clearly understood to be given by illustration and example only, the spirit and scope of the present invention being limited solely by the appended claims.

I claim:

1. A boat-canopy enclosure for the bed of a pickup truck and the like, which comprises:
   a rectangular boat structure adapted to enclose a truck bed including a bottom portion of spaced twin hulls and a covering floor secured to the top edges thereof, a top portion having spaced upwardly extending sides longitudinally connected along the floor boundary, the sides and said floor being extended forwardly to merge together into a square ended bow, and an upright panel enclosing the rear end of said floor and top portion of the structure, a deck strip connected to the upper edge of said sides and bow adapted to rest on and secured to the side walls of the truck bed, an elongated L-shape member having a vertical flange connected to the side wall behind said truck cab such that the horizontal flange extends above the top of said wall to provide a space there between for receiving a portion of the bow deck strip when said structure rests on said truck walls, a pair of extensible cylinders having one end pivotally connected to said top portion and the other to said truck bed, the cylinders being adapted to apply upward pressure on said structure, and a latching device detachably mounted on the rear wall of said truck bed and upright panel for securing said structure on said bed.

2. A boat-canopy enclosure as described in claim 1, wherein:

the L-shaped member comprises a vertical flange connected to the rear side wall of said truck bed and having a horizontal flange spaced above the top rail of said wall, the transverse edge is turned upwardly in an arcuate shaped lip sufficiently flexible to deflect and allow the bow deck strip to rotate under said member when said structure is raised to a hatch-back position.

3. A boat-canopy enclosure as described in claim 1, wherein:

said cylinder include a casing having a bottom end adapted for a pivotal connection with said truck bed, a compression spring contained therein, a shaft with a T-shaped end disposed against the end of the spring and an upper portion extending through an opening in the top of the casing and terminating upwardly in a pivotal connection with said structure, a bracket adapted to be pivotally connected to said shaft and secured to said structure, and a bracket connected to said bed of said truck and pivotally connected to the bottom of said casing.

4. A boat-canopy enclosure as described in claim 1, wherein:

said deck strip extends horizontally and inwardly for a width of approximately 3 inches, the width being established to enclose the transverse width of most truck beds, and further includes a downwardly extending lip to strengthen the gunwal of said structure.

5. A boat-canopy enclosure as described in claim 1, wherein:

said bow deck strip has a bulbois-like, thick leading edge adapted to rotate in the space between the horizontal flange of the L-shaped member and said top of said side wall behind said truck cab when said structure is lifted upwardly to a hatch-back position.

6. A boat-canopy enclosure as described in claim 4, wherein:

said extensible cylinder has an upper end of the shaft rotatably mounted in a bracket securely connected to the downwardly extending lip of said deck strip.

7. A boat-canopy enclosure as described in claim 6, wherein:

said extensible cylinder has the lower end rotatably mounted in a bracket securely connected to the floor of said truck bed in vertical alignment with the upper bracket.

* * * * *